United States Patent
Lange et al.

(10) Patent No.: US 6,914,163 B2
(45) Date of Patent: Jul. 5, 2005

(54) METHOD FOR PRODUCING POLYISOBUTYLPHENOLS

(75) Inventors: Arno Lange, Bad Dürkheim (DE); Hans Peter Rath, Grünstadt (DE)

(73) Assignee: BASF AG, Ludwigshafen (DE)

(*) Notice: Subject to any disclaimer, the term of this patent is extended or adjusted under 35 U.S.C. 154(b) by 0 days.

(21) Appl. No.: 10/381,377

(22) PCT Filed: Sep. 27, 2001

(86) PCT No.: PCT/EP01/11210
§ 371 (c)(1),
(2), (4) Date: Mar. 25, 2003

(87) PCT Pub. No.: WO02/26840
PCT Pub. Date: Apr. 4, 2002

(65) Prior Publication Data
US 2003/0187171 A1 Oct. 2, 2003

(30) Foreign Application Priority Data
Sep. 28, 2000 (DE) ......................... 100 48 150

(51) Int. Cl.[7] .............................. C07C 37/00
(52) U.S. Cl. .............. 568/792; 568/790; 568/793; 568/794
(58) Field of Search ................ 568/792, 790, 568/793, 794

(56) References Cited

U.S. PATENT DOCUMENTS

| | | | |
|---|---|---|---|
| 3,360,464 A | * | 12/1967 | Otto |
| 4,238,628 A | | 12/1980 | Cahill et al. |
| 4,322,220 A | * | 3/1982 | Machleder |
| 4,429,099 A | | 1/1984 | Kennedy et al. |
| 5,300,701 A | | 4/1994 | Cherpeck |
| 5,663,457 A | * | 9/1997 | Kolp |

FOREIGN PATENT DOCUMENTS

| | | |
|---|---|---|
| EP | 831 141 | 3/1998 |
| GB | 1159368 | 7/1969 |
| WO | 94/14739 | 7/1994 |

OTHER PUBLICATIONS

Polym.Bul.8,563–570(1982) Guhaniyogi et al.
J.Polym.Sci,A, vol. 31, 1923–1939(1993) Jamois et al.
Maenz, Angew. Makromol. Chem, vol. 242, pp 183–197 (1996).

* cited by examiner

Primary Examiner—Michael L. Shippen
(74) Attorney, Agent, or Firm—Novak Druce & Quigg, LLP

(57) ABSTRACT

Polyisobutenylphenols are prepared by alkylating an aromatic hydroxy compound with substantially monoethylenically unsaturated and substantially homopolymeric polyisobutenes in the presence of a Lewis acid alkylation catalyst by a process in which the polyisobutenes have a β double bond content of at least 35 mol %.

12 Claims, No Drawings

METHOD FOR PRODUCING POLYISOBUTYLPHENOLS

The present invention relates to a process for the preparation of polyisobutenylphenols by alkylating an aromatic hydroxy compound with substantially homopolymeric polyisobutenes in the presence of a Lewis acid alkylation catalyst.

It is known that aromatic hydroxy compounds can be alkylated with polyolefins using acid catalysts for the preparation of polyalkenylphenols. This Friedel-Crafts alkylation does not as a rule lead to pure monoalkylation products since the alkylated products are more reactive than the unsubstituted starting materials. A mixture of different mono-, di- and polyalkylation products is therefore generally formed. Moreover, when high molecular weight alkylating agents are used, fragmentation reactions frequently occur both in the polyolefin and in the alkylated product, so that as a rule a product mixture having a complex composition is obtained.

Such mixtures are unsuitable for many industrial applications. Rather, products of defined composition are required, frequently monoalkylation products, it also being possible for the position of the alkylation to be relevant.

For example, polyisobutenylphenol is an important starting material for the preparation of fuel detergents and is itself used as a fuel additive. It is advantageous if the phenol is substantially monoalkylated and/or substituted in the para position.

In order to increase the proportion of monoalkylation products, the prior art proposes using the phenol component in a large excess. The disadvantage of this process measure is the necessary removal of large amounts of unconverted phenols from the product mixture obtained.

GB-A-1 159 368 discloses the alkylation of phenol with monoolefinic polymeric alkylating agents having molecular weights 40 of from 700 to 300 000 using boron trifluoride phenolate.

U.S. Pat. No. 4,238,628 discloses a process for alkylating benzene, phenol and naphthol with polyolefins of monomers having at least three carbon atoms, preferably polybutene, in the presence of boron trifluoride as a catalyst. Before the alkylation reaction, the olefin polymer must be reacted with ethylene in order to obtain a substantial ethylene termination. The yield of alkylphenol is only from 44 to 64%.

U.S. Pat. No. 4,429,099 discloses the alkylation of phenol or substituted phenols with bis(polyisobutene)benzene or tris(polyisobutene)-benzene having molecular weights of from about 700 to 50 000 and from about 1 000 to 75 000, respectively. The catalysts disclosed are $AlCl_3$, $AlBr_3$, $BF_3$, $BF_3O(C_2H_5)_2$, $TiCl_4$, $SnCl_4$, $AlC_2H_5Cl_2$, $FeCl_3$, $SbCl_5$ and $SbF_5$. The polyisobutenes are vinylidene-terminated. A large excess of phenol is used, and long reaction times are required.

WO-A-94/14739 describes a process for the preparation of polyisobutenylhydroxy aromatics. In the process, a hydroxy aromatic compound, e.g. phenol, catechol, resorcinol, hydroquinone or pyrogallol, is reacted with polyisobutene having a number average molecular weight of from 300 to 5 000 in the presence of an acidic alkylation catalyst. Here, it is necessary for the polyisobutene (PIB) to contain at least 70% of terminal vinylidene units ($\alpha$-olefin). The PIB:phenol ratio should vary within the limits of from 1:1.2 to 1:5. However, ratios of from 1:2 to 1:3 are preferred and, in the examples disclosed, phenol is used throughout in a 100% excess (1:2). Without the evidence of a working example, it is asserted that the polyisobutenylphenols obtained would have from 70 to 100% para-substitution, whereas polyisobutenephenols prepared from conventional polyisobutene with a low $\alpha$-olefin content (low vinylidene polyisobutenes=from 2 to 6% $\alpha$-olefin content within the meaning of WO 94/14739) would have only from 0 to 40% para-substitution. This contradicts the experimental findings of EP-A-0 831 141. Example 1 of this document, in terms of the nature and amount of the starting materials (especially the highly reactive polyisobutene employed), catalyst employed, the solvent and the reaction time and reaction duration, corresponds to example 1 of WO-A-94/14739. Nevertheless, only a polyisobutenylphenol with 67% para-substitution is obtained. Here, the common teaching that highly reactive PIB leads to a high byproduct fraction is confirmed.

J. Polym. Sci. A, 31, S. (1993), 1938 describes the use of $SnCl_4$ as a catalyst. Here too, phenol is used in a large excess.

Kennedy, Guhaniyogi and Percec (Polym. Bull. 8, 563 (1970)) describe the use of $BF_3$ diethyletherate as an alkylation catalyst, the PIB:phenol ratio being 1:2.5 or 1:1.7 (based in each case on the polyisobutenyl terminal groups).

A common feature of the processes known to date for the alkylation of hydroxy aromatic compounds with polyolefins is that they have at least one and as a rule a plurality of the following disadvantages:

large excesses of phenol and/or amounts of catalyst are required, the polyolefin used must contain a high proportion of $\alpha$-olefin terminal units, fragmentation reactions of the polyolefin or of the alkylated product take place, undesirable byproducts, such as polyalkylation products or products alkylated in an undesirable position, are also obtained, the reaction times are long.

None of the abovementioned documents describes the use of substantially homopolymeric polyisobutene having a high $\beta$-olefin content.

It is an object of the present invention to provide an improved process for alkylating aromatic hydroxy compounds. As far as possible with respect to the starting materials, preferably predominantly monoalkylation products should result, it being possible to dispense with a large excess of the phenol component. In the alkylation reaction, preferably substantially no fragmentation reactions of the polyalkene or of the alkylated product should take place. If possible products alkylated preferably para to the OH function should result. In particular, the process should also be suitable for alkylating polyalkenes which have a relatively large proportion of non-$\alpha$ double bonds.

We have found, surprisingly, that this object is achieved by an alkylation process in which the reactivity is reduced by suitable measures. This can be effected on the side of the polyisobutene, by using a polyisobutene having a $\beta$-olefin content of at least 35% (and an $\alpha$-olefin content of at most 65%). In a preferred embodiment, a Lewis acid alkylation catalyst is additionally used in combination with an ether as a cocatalyst.

The present invention relates to a process for the preparation of polyisobutenylphenols by alkylating an aromatic hydroxy compound with substantially monoethylenically unsaturated and substantially homopolymeric polyisobutenes in the presence of a Lewis acid alkylation catalyst, wherein the polyisobutenes have a $\beta$ double bond content of at least 35 mol %.

It was surprisingly found that polyisobutenes having a high content of $\beta$-olefin terminal units (e.g. more than 35 mol % or more than 45 mol %), i.e. a low content of α-olefin terminal units (e.g. 65% or less), can generally be alkylated with good results in the presence of a Lewis acid alkylation catalyst. Suitable Lewis acid alkylation catalysts are the ones mentioned below, in combination with a cocatalyst or without one.

The present invention therefore relates to a process for the preparation of polyisobutenylphenols as described above, the polyisobutenes having a non-α double bond content of at least 35 mol %.

In this process, the yield of desired monoalkylated product is high and fragmentation reactions and/or the formation of polyalkylated products or products alkylated in an undesirable position are predominantly avoided.

In the context of this invention a substantially homopolymeric polyisobutene is understood as meaning a polyisobutene which comprises more than 90% by weight of isobutene units. Suitable comonomers are $C_3$–$C_6$-alkenes, preferably n-butene. The preparation and structure of the oligoisobutenes/polyisobutenes are known to a person skilled in the art (e.g. Günther, Maenz, Stadermann in Ang. Makrom. Chem. 234, (1996) 71). Homopolyisobutenes having a number average molecular weight of from about 300 to 5 000 are particularly preferred. Particularly preferred molecular weight ranges are from 400 to 3 000, in particular from 500 to 2 500. The polydispersity PD of the polyolefins is preferably from 1.05 to 3.0. However, it can if desired also be higher, for example greater than 5 or even greater than 12.

It is preferred to use polyisobutenes which if desired may contain up to 10% of n-butene as an incorporated comonomer. Polyisobutenes of this kind are prepared, for example, from butadiene-free $C_4$ cuts, which as a result of their production process generally include n-butene alongside isobutene. Particular preference is given to isobutene homopolymers.

Advantageously, the novel process is suitable for alkylating polyisobutenes which have a low proportion of α-double bonds. Thus, the novel process also permits the use of industrially obtainable polyisobutene mixtures for the alkylation.

Advantageously, the disadvantages known from the prior art and in particular fragmentation reactions do not generally occur.

The novel process is suitable advantageously for alkylating polyisobutenes which contain substantially α-double bonds in addition to an inventively high fraction of β-double bonds. Surprisingly, better yields of monoalkylated product and/or a lower tendency to the formation of polyalkylated products, or products alkylated at unwanted positions, are observed than when using polyisobutenes containing at least 70% of α-double bonds. This effect occurs, surprisingly, especially when using polyisobutenes having β-double bonds and to a lesser extent when the double bonds are situated further toward the interior (γ-positioned bonds, etc.). Polyisobutenes which contain at least 70, particularly preferably at least 80, especially at least 85, mol % of α- and/or β-double bonds are preferably used for the alkylation, i.e., which contain at least 70 mol % of terminal methylvinylidene groups (—C(—CH$_3$)=CH$_2$) (=α-olefin) and/or dimethylvinyl groups (—CH=C(CH$_3$)$_2$) (=β-olefin).

Preferred polyisobutenes are reactive polyisobutenes which differ from the low-reactivity polyisobutenes through the content of double bonds in the α or β position. A particularly suitable reactive polyisobutene is, for example, Glissopal® CE 5203 from BASF AG (42% of β-olefin, 58% of α-olefin, number average molecular weight $M_n$=1000).

In the context of this application, Lewis acid alkylation catalysts are understood as meaning both individual acceptor atoms and acceptor atom-ligand complexes, molecules, etc., provided that they have overall (external) Lewis acid (electron acceptor) properties. Preferred catalysts are the halides of boron, aluminum, tin or a transition metal, preferably titanium and iron. $BF_3$, $SnCl_4$, $TiCl_4$ and $FeCl_3$ are particularly preferred.

In an advantageous embodiment, the alkylation catalysts (Lewis acids) are used together with at least one ether as a cocatalyst. Ethers having a molecular weight of at least 102 g/mol are in general the preferred embodiment. The molecular weight of the ethers is preferably from 102 to 242 g/mol. $BF_3$ is easy to handle as a phenol complex.

Ethers suitable as cocatalysts and having a molecular weight of less than 102 g/mol are, for example, dimethyl ether, ethyl methyl ether and diethyl ether. Ethers preferred as cocatalysts are selected from symmetrical and asymmetrical ethers which have two hydrocarbon radicals of 6 to 16 carbon atoms in total. These hydrocarbon radicals may be aliphatic, cycloaliphatic or aromatic radicals. Cyclic ethers in which the ether group is part of the ring are also suitable. Di($C_3$–$C_8$)alkyl ethers, such as di-n-propyl ether, diisopropyl ether, methyl tert-butyl ether and isopropyl tert-butyl ether, tetrahydrofuran, di($C_5$–$C_8$)cycloalkyl ethers, such as dicyclohexyl ether and ethers having at least one aromatic hydrocarbon radical, such as anisole, are preferred.

The aromatic hydroxy compound used for the alkylation is preferably selected from phenolic compounds having 1, 2 or 3 OH groups, which may have at least one further substituent. Preferred further substituents are $C_1$–$C_8$-alkyl, in particular methyl and ethyl. In particular, compounds of the formula

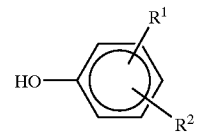

where $R^1$ and $R^2$, independently of one another, are each hydrogen, OH or $CH_3$, are preferred. Phenol, the cresol isomers, catechol, resorcinol, pyrogallol, fluoroglucinol and the xylenol isomers are particularly preferred. In particular, phenol, o-cresol and p-cresol are used. If desired, mixtures of the abovementioned compounds may also be used for the alkylation.

In the novel process, catalyst and cocatalyst are preferably used in a molar ratio of from 1:10 to 10:1.

Advantageously, the novel process permits the substantially selective monoalkylation of aromatic hydroxy compounds without very large excess amounts of aromatic hydroxy compound having to be used, as described in the prior art. Preferably, aromatic hydroxy compounds and polyalkenes are used in a molar ratio of from 1.5:1 to 1:1, particularly preferably from 1.2:1 to 1:1. Specifically it is possible to use aromatic hydroxy compounds and polyalkene in substantially equimolar ratios, such as from 1.1:1 to 1:1, more especially from 1.05:1 to 1:1. An excess of the aromatic hydroxy compound of 100% or more, however, is of course also suitable. The novel process generally gives polyalkenylphenols which (if the starting material used permits polyalkylations) have a degree of polyalkylation with the polyalkene of not more than 20, preferably not more than 10, in particular not more than 5, mol %.

As a rule, from 1 to 30 mol %, based on the polyolefin, of catalyst or catalyst/cocatalyst complex are used. In specific cases, larger amounts such as 50 or 80 mol % can be used, for example to achieve higher rates of reaction. The complexes can have been produced beforehand or are prepared in situ. The novel Lewis acids, as such or in an inert solvent, are combined with one or more ethers.

The novel process can advantageously be carried out as a rule in the absence of a solvent. In some cases, however, the use of a hydrocarbon, such as n-alkane, or a mixture of said hydrocarbons as a solvent is advantageous. Owing to the low reactivity of the catalyst/olefin complex alkyl aromatics or mixtures thereof may also be used. Aromatics, such as toluene, ethylbenzene, o-xylene, m-xylene, p-xylene, the isomeric trimethylbenzene or mixtures thereof (e.g. the mixtures sold by Exxon Company as "aromatic 100" or "aromatic 150"), are particularly advantageously used here, it being possible for further reaction stages to take place or the product being marketed.

The alkylation is preferably carried out at from −10° C. to +100° C. The exact reaction temperatures are dependent, inter alia, on the catalyst used. A particularly preferred temperature range is from 15 to 60° C., in particular from 15 to 40° C. The reaction is usually carried out at atmospheric pressure but may also be carried out at superatmospheric or reduced pressures.

The order of the addition of the reaction components is in principle unimportant. For example, the hydroxy aromatic compound can be initially taken as such or in solution, the catalyst as such, as an adduct or as a mixture with an ether can be added and finally the polyolefin, likewise as such or in solution, can be added. Alternatively, the hydroxy aromatic compound can also be initially taken together with the polyolefin, and the Lewis acid added. The reaction can be stopped by means of a base, for example ammonia solution. After washing with water, the organic phase is generally dried by conventional methods, for example over sodium sulfate or magnesium sulfate, and the solvent is removed.

Some particularly preferred reaction systems are mentioned below:

$BF_3$ and Complexes

A polyisobutylene having a vinylidene content of less than 65% (e.g. less than 50%, 40%, 30%) is reacted with phenol, ortho-cresol or para-cresol using $BF_3$ as a catalyst, with or without corresponding cocatalysts, to give polyisobutenylphenol or polyisobutenylcresol. Examples are the $BF_3$ complexes with phenol or ethers, such as $(C_2H_5)_2O$, $(n-C_3H_7)_2O$, $(i-C_3H_7)_2O$, $t-C_4H_9$—O—$CH_3$, $t-C_4H_9$—O-i-$C_3H_7$, tetrahydrofuran, dicyclohexyl ether or anisole.

$SnCl_4$, $FeCl_3$, $TiCl_4$ and Their Complexes

A homopolyisobutylene having a vinylidene content which is less than 65% (e.g. 30, 50 or 60%) is reacted with phenol, ortho-cresol or para-cresol using $SnCl_4$, $FeCl_3$ or $TiCl_4$ as the Lewis acid catalyst, with or without corresponding cocatalysts to give polyisobutenylphenol or polyisobutenylcresol. $SnCl_4$ complexes, $FeCl_3$ complexes and $TiCl_4$ complexes with ethers such as $(n-C_3H_7)_2O$, $(i-C_3H_7)_2O$, $t-C_4H_9$—O—$CH_3$, $t-C_4H_9$—O-i-$C_3H_7$, tetrahydrofuran, dicyclohexyl ether or anisole, are preferably used.

Complexes with ethers in a molecular weight range M from 102 to 242, such as $(n-C_3H_7)_2O$, $(i-C_3H_7)_2O$, $t-C_4H_9$—O—$CH_3$, $t-C_4H_9$—O-i-$C_3H_7$, dicyclohexyl ether or anisole, should be particularly singled out. A homopolymer of isobutene which comprises at least 90% (e.g. 95%) of isobutene units and which in total is α- or β-olefin terminated to an extent of at least 80% can be particularly uniformly reacted therewith. Thus, uniform 4-polyisobutenylphenols, 2-methyl-4-polyisobutenylphenols or 4-methyl-2-polyisobutenylphenols are obtained with only small excess amounts (e.g. 5 or 15%) of phenol, o-cresol or p-cresol. These contain less than 20, generally less than 10 or 5, mol % of more highly substituted isomers, for example the disubstitution products. Larger excess amounts of phenol or cresol are possible and lead to an even higher content of 4-isobutenylphenol (from phenol or ortho-cresol) or 2-isobutenylphenol (from para-cresol) in the product.

When $BF_3$ and complexes thereof are used, the reaction is preferably carried out at from −10 to 50° C. Alkylation can be particularly easily effected at from 15 to 40° C. The reaction is preferably carried out at from −10 to 100° C. in the case of $SnCl_4$ and $FeCl_3$ and complexes thereof, and at from −10 to 80° C. in the case of $TiCl_4$ and complexes thereof. In these cases, alkylation can be particularly easily effected at from 15 to 60° C.

The polyisobutenylphenols obtained by the novel process are suitable for a large number of industrial applications and in particular as fuel additives and as intermediates for the preparation of fuel detergents.

The present invention furthermore relates to a process for the preparation of functionalized polyisobutenylphenols, comprising:

i) the preparation of polyisobutenylphenols by alkylating an aromatic hydroxy compound with substantially monoethylenically unsaturated polyisobutenes in the presence of a Lewis acid alkylation catalyst, as described above, and ii) the functionalization of the polyisobutenylphenols obtained in step i) by aminoalkylation and/or polyether formation.

Suitable processes for the preparation of polyisobutenylphenol-containing Mannich adducts are known to a person skilled in the art and are described, for example, in EP-A-0 831 141 and the unpublished German patent application P 199 48 114.8. The specification part of EP-A-0 831 141 and an English language translation of the specification part of the German application are, in the entirety, reproduced subsequent to Example 6.

The examples which follow illustrate the invention without restricting it.

EXAMPLE 1

24 g of phenol are melted under nitrogen at 40 to 45° C. in a four-necked flask. 3.5 g of $BF_3$ diethyl ether adduct are added and the mixture is cooled to room temperature. Then 80 g of polyisobutene (Mn=1 000, containing 60% of terminal dimethylvinyl groups and 35% of terminal methylvinylidene groups), as a solution in 100 ml of hexane, are added dropwise at from 20 to 25° C. and this mixture is stirred at a temperature of 30° C. for 4 h. The reaction is stopped with 100 ml of 25% ammonia solution, the organic phase is washed with water and dried over $Na_2SO_4$, and the solvent is distilled off. This gives 39 g of an oil (polyisobutenylphenol).

NMR: 7.2 ppm (doublet, 2H), 6.7 ppm (doublet, 2H), 4.8 ppm (singlet, 1H), 1.75 ppm (singlet, 2H), 1.5–0.5 ppm (singlets, 139H)

This corresponds to an Mn of the alkyl radical of 1 000.

The NMR spectrum corresponds to that of a para-substituted polyisobutenylphenol. In the signal range from 7.1 to 6.75 ppm, there are small signals which represent about 5% of 2- or 2,4-substituted phenol.

EXAMPLE 2

56.7 g of phenol are dissolved in 30 ml of xylene in a four-necked flask. 4.6 g of $BF_3$-phenol complex are added at a temperature of from 20 to 25° C. and 295 g of polyisobutene (Mn=950, containing 49% of terminal dimethylvinyl groups and 45% of terminal methylvinylidene groups), in solution in 200 ml of hexane, are added dropwise over the course of 15 minutes at a temperature in the range from 20 to 30° C. The mixture is then reacted at a temperature of from 20 to 25° C. for 18 h and the resulting solution is extracted 4 times with 130 ml of methanol each time. The solvent is removed at 120° C. and 5 mbar, giving 290 g of a viscous pale oil.

GPC (gel permeation chromatography) indicated a number-average molecular weight Mn of 1 050 and a polydispersity PD of 1.5.

NMR: 7.2 ppm (doublet, 2H), 6.7 ppm (doublet, 2H), 4.8 ppm (singlet, 1H), 1.75 ppm (singlet, 2H), 1.5–0.5 ppm (singlets, 135H)

The NMR spectrum corresponds to that of a para-substituted polyisobutenylphenol. In the signal range from 7.1 to 6.75 ppm, there are small signals which may represent about 5% of 2- or 2,4-substituted phenol.

EXAMPLE 3

10 g of phenol are dissolved in 10 ml of xylene in a 250 ml four-necked flask. 3.2 g of $BF_3$-phenol complex are added at a temperature of from 20 to 25° C. 100 g of polyisobutene (Mn=1 050, containing 40% of terminal dimethylvinyl groups), in solution in 60 ml of kerosene, are added dropwise over the course of 15 minutes at 15° C. and the resulting mixture is left to react at a temperature of from 20 to 25° C. for 4.5 h. The resulting solution is extracted 4 times with 50 ml of methanol each time and then the solvent is removed at 120° C. and 5 mbar, giving 105 g of a viscous pale oil.

NMR: 7.2 ppm (doublet, 2H), 6.7 ppm (doublet, 2H), 4.8 ppm (singlet, 1H), 1.75 ppm (singlet, 2H), 1.5–0.5 ppm (singlets, 135H)

The NMR spectrum corresponds to that of a para-substituted polyisobutenylphenol. In the signal range from 7.1 to 6.75 ppm, there are small signals which may represent about 5% of 2- or 2,4-substituted phenol.

EXAMPLE 4

24 g of phenol are melted under nitrogen at from 40 to 45° C. in a four-necked flask. 3.5 g of $BF_3$ diethyl ether adduct are added dropwise and the mixture is cooled to room temperature. 80 g of polyisobutene (Mn=1 000, containing 60% of terminal dimethylvinyl groups and 32% of α-olefin), in solution in 100 ml of hexane are added dropwise at from 20 to 25° C. Stirring is then continued at 30° C. for 4 h. The reaction is stopped with 100 ml of 25% ammonia solution. The organic phase is washed with water, dried over $Na_2SO_4$ and concentrated in a rotary evaporator:

67 g of oil (PIB phenol)

NMR: 7.2 ppm (doublet, 2H), 6.7 ppm (doublet, 2H), 4.8 ppm (singlet, 1H), 1.75 ppm (singlet, 2H), 1.5–0.5 ppm (singlets, 139H)

This corresponds to an Mn of the alkyl radical of 1 000.

The NMR spectrum corresponds to that of a para-substituted polyisobutenylphenol. In the signal range from 7.1 to 6.75 ppm, there are small signals which represent from 5 to 10% of 2- or 2,4-substituted phenol.

EXAMPLE 5

21 g of phenol are dissolved in 15 ml of xylene in a four-necked flask. 5 g of $BF_3$-phenol complex are added at a temperature of from 20 to 25° C. 120 g of polyisobutene (Mn=550, containing 40% of β-olefin and 54% of α-olefin) in solution in 60 ml of kerosene are added dropwise over the course of 30 minutes at a temperature of from 20 to 25° C. and the resulting mixture is then left to react at a temperature of 25° C. for 4 h. The resulting solution is extracted 3 times with 130 ml of methanol each time and the solvent is removed on a rotary evaporator at 120° C. and 5 mbar, giving 125 g of a pale viscous oil.

NMR: 7.2 ppm (doublet, 2H), 6.7 ppm (doublet, 2H), 4.8 ppm (singlet, 1H), 1.75 ppm (singlet, 2H), 1.5–0.5 ppm (singlets, 77H)

The NMR spectrum corresponds to that of a para-substituted polyisobutenylphenol. In the signal range from 7.1 to 6.75 ppm, there are small signals which represent about 10% of 2- or 2,4-substituted phenol.

EXAMPLE 6

10 g of phenol are dissolved in 10 ml of toluene in a 250 ml four-necked flask. 5 g of $BF_3$ phenoxide and 4 g of diisopropyl ether are added at a temperature of from 20 to 25° C. 100 g of polyisobutene (Mn=990, containing 53% of β-olefin and 44% of α-olefin) in solution in 60 ml of kerosene, are added dropwise over 30 minutes at from 20 to 25° C. and the resulting mixture is left to react at a temperature of 25° C. for 8 h. The resulting solution is extracted 3 times with 130 ml of methanol each time and then the solvent is removed on a rotary evaporator at 120° C. and 5 mbar, giving 100 g of a viscous pale oil.

NMR: 7.2 ppm (doublet, 2H), 6.7 ppm (doublet, 2H), 4.8 ppm (singlet, 1H), 1.75 ppm (singlet, 2H), 1.5–0.5 ppm (singlets, 142H)

The NMR spectrum corresponds to that of a para-substituted polyisobutenylphenol. In the signal range from 7.1 to 6.75 ppm, there are small signals which represent from 5 to 10% of 2- or 2,4-substituted phenol.

Reproduction of the specification part of EP-A-0 831 141:

The present invention relates to detergents for use in hydrocarbon fuels. Hydrocarbon fuels generally contain numerous deposit-forming substances. When used in internal combustion engines, deposits tend to form on and around constricted areas of the engine in contact with the fuel. In diesel engines, deposits tend to accumulate in the fuel injection system, thereby hampering good performance of the engine. In automobile engines deposits can build up on engine intake valves leading to progressive restriction of gaseous fuel mixture flow into the combustion chamber and also to valve sticking. It is common practice therefore to incorporate a detergent in the fuel composition for the purpose of inhibiting the formation, and facilitating the removal, of engine deposits, thereby improving engine performance. Certain Mannich condensation products, obtained by reacting hydrocarbon-substituted phenols, aldehydes and amines, are known as detergents for fuels. These have an advantage over polyisobutene amine detergents in that they are substantially chlorine free.

U.S. Pat. No. 4,117,011 discloses as dispersants/detergents for lubricating oils and hydrocarbon fuels Mannich condensation products, obtained by reacting hydrocarbon-substituted phenols, aldehydes, amines and alkylene oxides. Preferred reactants include polyisobutene-substituted phenols, formaldehyde, and alkylene polyamines such as diethylene triamine, which in one process are combined in a Mannich condensation reaction before being reacted with a polyalkylene oxide.

CA-A-2089833 and EP-A-647700 both disclose fuel compositions containing detergent additives which comprise Mannich reaction products of an polyisobutene-substituted phenol, an amine and an aldehyde, the amine preferably being an alkylene polyamine such as diethylene triamine, triethylene tetramine and the like. Although ethylene diamine is mentioned in EP-A-647700 as a possible amine, no compounds employing it are disclosed, and it is not amongst the preferred amines; nor is there any mention in either of these documents of the nature of the polyisobutene employed.

We have discovered that Mannich condensation products of particular polyisobutene-substituted phenols, an aldehyde and ethylene diamine are especially good detergents in fuels, and significantly better than those described in the above-mentioned prior art. These particular products have not been specifically disclosed in any of the above prior art. Accordingly in one aspect the present invention comprises the Mannich reaction product of a) a polyisobutene-substituted phenol where the polyisobutene is one in which at least 70% of the terminal olefinic double bonds are vinylidene;
b) an aldehyde;
c) ethylene diamine.

A second aspect of the invention provides provides a fuel composition comprising a major amount of a hydrocarbon fuel, and from 10 to 1000 ppm of the above reaction product.

Polyisobutenes (PiBs) in which at least 70% of the terminal olefinic double bonds are of the vinylidene type are commonly known as "high reactive" polyisobutenes, as distinct from "low reactive" PiBs (having a lower proportion of vinylidene terminal double bonds) which are commonly used. Examples of "high reactive" polyisobutenes include Ultravis® marketed by BP Chemicals and Glissopal® marketed by BASF. The compounds of the invention, derived specifically from ethylene diamine and a PiB phenol in which the PiB is highly reactive, are surprisingly superior in performance to known fuel detergents based on Mannich chemistry.

Preferably the PiB has a number average molecular weight of from 700 to 2300, particularly from 750 to 1500. The aldehyde is preferably a ($C_1$–$C_6$) aldehyde, most preferably formaldehyde.

As mentioned above, the compounds of the invention are made by a Mannich reaction; the conditions required for Mannich reactions are well known in the art. Another aspect of the invention provides a process for producing a compound as defined above, comprising reacting together an polyisobutene phenol, an aldehyde, and ethylene diamine under conditions suitable for a Mannich condensation reaction.

It is preferred that the compound of the invention is present in the fuel composition in the from of an additive package, the package being present at a level of from 200 to 3000 ppm, preferably from 600 to 1000 ppm. Thus another aspect of the invention provides an additive package for a fuel composition, comprising from 5 to 30% by weight of a compound as defined above, a carrier fluid, and optionally a solvent, preferably an aromatic or aliphatic hydrocarbon solvent. Suitable carrier fluids include alkyl phenols, optionally alkoxylated; esters of acids/alcohols, acids/polyols or acids/glycol ethers, the acids being saturated or unsaturated; phthalate esters; trimellitate esters; alkoxylated alcohols or polyols; polyalkylene glycols; and lubricating oils. Suitable solvents may include most known aromatic or aliphatic hydrocarbons or glycol ethers. The invention also comprises in a still further aspect the use of the above compounds and additive packages as detergents in hydrocarbon fuels.

The hydrocarbon fuel may suitably comprise a hydrocarbon fraction boiling in the gasoline range or a hydrocarbon fraction boiling in the diesel range. Gasolines suitable for use in spark ignition engines, e.g. automobile engines, generally boil in the range from 30 to 230° C. Such gasolines may comprise mixtures of saturated, olefinic and aromatic hydrocarbons. They may be derived from straight-run gasoline, synthetically produced aromatic hydrocarbon mixtures, thermally or catalytically cracked hydrocarbon feedstocks, hydrocracked petroleum fractions or catalytically reformed hydrocarbons. The octane number of the base fuel is not critical and will generally be above 65. In the gasoline, hydrocarbons may be replaced in part by alcohols, ethers, ketones or esters, typically in an amount up to 20% by weight. Alternatively, as the liquid hydrocarbon fuel there may be used any fuel suitable for operating spark compression engines, such as those which may be found in road vehicles, ships and the like. Generally, such a diesel fuel will boil in the range from about 140° C. to about 400° C. (at atmospheric pressure), particularly in the range from about 150 to 390° C., especially from about 175 to 370° C. Such fuels may be obtained directly from crude oil (straight-run) or from a catalytically or thermally cracked product or a hydrotreated product, or from a mixture of the aforesaid. Alternatively there may be used a biofuel, for example rape seed methyl ester. The cetane number will typically be in the range from 25 to 60.

The fuel composition contains the compound of formula (I) in an amount sufficient to provide dispersancy. Typically in a gasoline fuel this amount will be in the range from 20 to 1000 ppm w/w based on the total weight of the composition. Typically in a diesel fuel this amount will be in the range from 10 to 500 ppm w/w based on the total weight of the composition.

The fuel composition may suitably be prepared by blending a concentrate composition comprising a fuel compatible hydrocarbon solvent and the compound of formula (I) with the hydrocarbon fuel.

The fuel composition in addition to the compound of formula (I) may contain known additives. The nature of the additives will depend to some extent on the end-use of the fuel composition. Diesel fuel compositions may contain nitrates or nitrites as a cetane improver, or copolymers of ethylene and/or vinylesters, e.g. vinylacetate, as a pour point depressant. Gasoline fuel compositions may contain a lead compound as an anti-knock additive and/or an antioxidant, e.g. 2,6-di-tert-butyl phenol, and/or an anti-knock compound other than a lead compound, and/or an additional dispersant, for example a PIB polyamine. The other additives (if any) may be blended directly into the fuel composition or may be incorporated by way of a concentrate composition.

The invention will now be further illustrated by reference to the following examples. It should be noted that the comparative examples below all employ Ultravis® 10, a highly reactive polyisobutene, whereas equivalent compounds in the prior art are not disclosed as using a highly reactive polyisobutene and would therefore be expected to perform worse in these tests.

EXAMPLE 1

Preparation of Polyisobutene-substituted Phenol 203.2 g (2.16 mol) of phenol was melted at 40° C. and added to boron trifluoride etherate (73.5 ml, 0.60 mol) in a 5 liter round bottomed flask. Ultravis® 10 (1040 g, 1.09 mol), a "highly reactive" polyisobutene (PiB) (Mw=1000), was dissolved in hexane (1863 ml) and the solution added to the flask containing the phenol via a pressure equalising dropping funnel, at a rate sufficient to maintain the temperature of the reaction mixture at 22–27° C. This took three hours. The solution was stirred for a further 16 hours at room temperature before ammonia (400 ml of 30% w/w aqueous, 2.88 mol) was added. The solution turned a deep blue colour. 1000 ml of water was added and the mixture stirred, after which it was separated in a five liter separating funnel and the aqueous layer extracted with 4×500 ml hexane. The organic layers were combined and dried over $MgSO_4$ overnight, then filtered through a 12 mm Celite pad. The solvent was removed from the filtrate at 80° C./23"Hg on a rotary evaporator. The product was found to comprise polyisobutene-substituted phenol with a para to ortho ratio of about 3:1.

EXAMPLE 2

Preparation of Adduct of Polyisobutene-substituted Phenol and Ethylene Diamine

The polyisobutene-substituted phenol of Example 1 (300 g, 0.295 mol), paraformaldehyde (8.86 g, 0.295 mol) and toluene (100 g, solvent) were charged to a round-bottomed flask and heated rapidly to 100° C., 17.73 g (0.295 mol) of ethylene diamine (EDA) was then added over 5 minutes via a pressure equalising dropping funnel. The reaction was heated to 126° C. for four hours and 5.5 ml water collected: the reaction was then refluxed at 125° C. for three hours. The product was transferred to a one liter Florentine flask and the solvent removed on a rotary evaporator at 80° C./29.5"Hg. A cloudy brown residue was filtered through a 12 mm Celite pad to yield a clear golden viscous liquid. Analysis revealed 1.68% nitrogen, alkalinity value of 70.04 mg KOH $g^{-1}$, 3 ppm residual chlorine.

EXAMPLE 3 (COMPARATIVE)

Preparation of Adduct of Polyisobutene-substituted Phenol and Dimethylaminopropylamine The procedure and reactants of Examples 1 and 2 were followed, except that instead of ethylene diamine, 30.19 g (0.295 mol) of dimethylaminopropylamine (DMAPA) was used. Analysis revealed 2.12% nitrogen, alkalinity value of 85.3 mg KOH $g^{-1}$, 80 ppm residual chlorine.

EXAMPLE 4 (COMPARATIVE)

Preparation of Adduct of Polyisobutene-substituted Phenol and Diethylene Triamine The procedure and reactants of Examples 1 and 2 were followed, except that instead of dimethylaminopropylamine, 30.44 g (0.295 mol) of diethylene triamine (DETA) was used. Analysis revealed 3.2% nitrogen, alkalinity value of 135.9 mg KOB $g^{-1}$, 25.8 ppm residual chlorine.

EXAMPLE 5 (COMPARATIVE)

Preparation of Adduct of Polyisobutene-substituted Phenol and Triethylene Tetramine The procedure and reactants of Examples 1 and 2 were followed, except that instead of dimethylaminopropylamine, 43.14 g (0.295 mol) of triethylene tetramine (TETA) was used. Analysis revealed 4.4% nitrogen, alkalinity value of 156.2 mg KOH $g^{-1}$, 3.9 ppm residual chlorine.

Engine Tests

A: CEC Test

The compounds prepared in the Examples above were evaluated as detergency additives in fuels according to a standard engine test, following method CEC F-05 A-93 on a Mercedes Benz M 102.982 engine. The fuel employed was unleaded CEC RF 83-A-91, and the oil RL-189/1. The compounds tested were incorporated in an additive package with the following formulation:

| | |
|---|---|
| paradodecylphenol/propylene oxide (11:1 mol ratio) carrier | 37.7% by weight |
| HAN 8572 (Exxon Chemicals) aromatic solvent | 45.3% by weight |
| additive of Examples 2–5 | 17.0% by weight |

The package was dosed in the fuel at 800 ml/m$^3$.

Measurements were made of the inlet valve deposits, and the valves were also given a visual rating. In this test a visual rating of 9.5 or greater is considered to be a good result.

TABLE 1

| EXAMPLE | DEPOSIT (mg) | AVE. VISUAL RATING |
|---|---|---|
| no additive package | 278 | 7.59 |
| 2 (EDA) | 16 | 9.66 |
| 3 (DMAPA) | 30 | 9.53 |
| 4 (DETA) | 37 | 8.93 |
| 5 (TETA) | 89 | 8.47 |

These results show that the EDA additive is significantly more effective than the additives derived from other amines.

B: Opel Kadett Test

The compounds prepared in Examples 2 and 3 above were evaluated as detergency additives in fuels according to the standard Opel Kadett engine test. The fuel employed was "City Gasoline" from Scandanavia. The compounds tested were incorporated in the same additive package as in Test A above. The package was dosed in the fuel at 800 ml/m$^3$ in the case of the DMAPA additive, and 600 ml/m$^3$ in the case of the EDA additive. Measurements were made of the inlet valve deposits as before.

TABLE 2

| EXAMPLE | DEPOSIT (mg) |
|---|---|
| no additive package | 200–250 |
| 2 (EDA)-600 ml/m$^3$ | 0 |
| 3 (DMAPA)-800 ml/m$^3$ | 24 |

This result shows the exceptional performance of the EDA-based additive compared with that of the DMAPA additive, even though the EDA additive was employed at a lower dose rate.

C: 10000 Mile Vauxhall Astra Field Test

The compounds prepared in Examples 2 and 3 above were evaluated as detergency additives in fuels according in a field test, involving 10,000 miles driving in a Vauxhall Astra. The fuel employed unleaded Total Premium ULP MSS/195, and the oil BP Visco 2000. The compounds tested were incorporated in the same additive package as in the two tests above, and the package dosed in the fuel at 800 ml/m$^3$.

Measurements were made of the inlet valve deposits, and the valves were also given a visual rating. In this test a visual rating of 9.5 or greater is considered to be a good result.

TABLE 3

| EXAMPLE | DEPOSIT (mg) | AVE. VISUAL RATING |
|---|---|---|
| no additive package | 427 | 6.5 |
| 2 (EDA) | 23.5 | 9.9 |
| 3 (DMAPA) | 42 | 9.5 |

These results again show that the EDA additive is significantly more effective than the additives derived from other amines.

D: Diesel Engine Test

The compounds prepared in the Examples above were evaluated as detergency additives in fuels according Peugeot XUD 9 engine test. The fuel employed was RF90/6 diesel. The compounds tested were incorporated in an additive package with the following formulation:

| kerosine-type solvent | 35.9% weight |
|---|---|
| additive of Examples 2–5 | 22.7% |
| cetane improver | 18.9% |
| lubricity agent | 9.1% |
| dodecyl phenol | 5.3% |
| demulsifier | 4.6% |
| corrosion inhibitor | 3.0% |
| antifoam | 0.5% |

The package was dosed in the fuel at 680 ml/m$^3$.

Measurements were made of percentage flow loss at 0.1 mm needle lift; the lower the figure the better the result.

TABLE 4

| EXAMPLE | % flow loss at 0.1 mm needle lift |
|---|---|
| no additive package | 89.6% |
| 2 (EDA) | 75.6% |
| 3 (DMAPA) | 86.4% |
| 4 (DETA) | 87.3% |
| 5 (TETA) | 81.7% |

These results once again demonstrate the superiority of the EDA detergent.

We claim:

1. A process for the preparation of polyisobutenylphenols which comprises alkylating an aromatic hydroxy compound with substantially monoethylenically unsaturated and substantially homopolymeric polyisobutenes in the presence of a Lewis acid alkylation catalyst, wherein the polyisobutenes have a content of dimethylvinyl groups (—CH=C(CH$_3$)$_2$ groups) of at least 35 mol %, the catalyst is employed in an amount of from 1 to 30 mol % based on the polyolefin, the catalyst optionally comprises an ether as cocatalyst, and the polyisobutenylphenols are polyalkylated with the polyisobutene to a decree of not more than 20 mol %.

2. A process as claimed in claim 1, wherein the catalyst is selected from the halides of boron, aluminum, tin or a transition metal.

3. A process as claimed in claim 2, wherein the catalyst is selected from BF$_3$, SnCl$_4$, TiCl$_4$ and FeCl$_3$.

4. A process as claimed in claim 1, wherein the ether has a molecular weight of from 102 to 242 g/mol.

5. A process as claimed in claim 1, wherein catalyst and cocatalyst are used in a molar ratio of from 1:10 to 10:1.

6. A process as claimed in claim 1, wherein aromatic hydroxy compounds and polyalkylenes are used in a molar ratio of from 1.5:1 to 1:1.

7. A process as claimed in claim 1, wherein the polyisobutenylphenols are polyalkylated to a degree of not more than 10 mol %.

8. A process as claimed in claim 1, wherein the alkylation is effected at from 15 to 40° C.

9. A process as claimed in claim 1, additionally comprising the functionalization of polyisobutenylphenols by aminoalkylation and/or polyether formation.

10. A process as claimed in claim 1, wherein aromatic hydroxy compounds and polyalkylenes are used in a molar ratio of from 1.2:1 to 1:1.

11. A process as claimed in claim 1, wherein the polyisobutenylphenols are polyalkylated to a degree of not more than 5 mol %.

12. A process as claimed in claim 1, wherein the dimethylvinyl group content of the polyisobutenes is at least 45 mol %.

* * * * *